(12) United States Patent
Uneura et al.

(10) Patent No.: US 11,306,728 B2
(45) Date of Patent: Apr. 19, 2022

(54) TURBOCHARGER

(71) Applicant: IHI Corporation, Koto-ku (JP)

(72) Inventors: Yutaka Uneura, Tokyo (JP); Hideyuki Kojima, Tokyo (JP); Takahiro Tanaka, Tokyo (JP); Shunsuke Nishii, Tokyo (JP); Hiroki Mochizuki, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/899,721

(22) Filed: Jun. 12, 2020

(65) Prior Publication Data

US 2020/0300260 A1  Sep. 24, 2020

Related U.S. Application Data

(63) Continuation of application No. PCT/JP2018/043076, filed on Nov. 21, 2018.

(30) Foreign Application Priority Data

Jan. 4, 2018 (JP) .............................. JP2018-000127

(51) Int. Cl.
*F04D 29/056* (2006.01)
*F02B 37/00* (2006.01)

(52) U.S. Cl.
CPC .......... *F04D 29/0563* (2013.01); *F02B 37/00* (2013.01); *F05B 2220/40* (2013.01); *F05B 2240/54* (2013.01)

(58) Field of Classification Search
CPC .......... F02B 37/00; F02B 39/00; F02B 39/14;
F04D 13/12; F04D 29/0563; F04D
29/059; F04D 29/063; F04D 29/584;
F04D 29/668; F05B 2220/40; F05B
2240/54;
(Continued)

(56) References Cited

U.S. PATENT DOCUMENTS 3,811,741 A * 5/1974 McInerney ............. F16C 27/02
384/291
4,721,441 A * 1/1988 Miyashita ............. F01D 25/164
384/518

(Continued)

FOREIGN PATENT DOCUMENTS

CN 102016325 A 4/2011
CN 106460653 A 2/2017
(Continued)

OTHER PUBLICATIONS

JP-2005171796 Translation, Jun. 2005 ; Umekawa, Takahiro.*
(Continued)

*Primary Examiner* — Jesse S Bogue
(74) *Attorney, Agent, or Firm* — Oblon, McClelland, Maier & Neustadt, L.L.P.

(57) ABSTRACT

A turbocharger includes ball bearings each including an inner ring and an inner ring mounted to a shaft, and an outer ring and an outer ring provided so as to be relatively rotatable in a bearing hole, and damper portions formed in at least one of outer peripheral surfaces of the outer ring and the outer ring and opposed surfaces of inner peripheral surface of the bearing hole opposed to the outer peripheral surfaces of the outer ring and the outer ring.

13 Claims, 6 Drawing Sheets

(58) Field of Classification Search
CPC ...... F05D 2220/40; F16C 19/16; F16C 27/00; F16C 33/58; Y02T 10/12
See application file for complete search history.

(56) References Cited

U.S. PATENT DOCUMENTS

| | | | | |
|---|---|---|---|---|
| 4,943,170 A | * | 7/1990 | Aida | F16C 35/04 |
| | | | | 384/99 |
| 4,997,290 A | * | 3/1991 | Aida | F01D 25/164 |
| | | | | 384/474 |
| 5,253,985 A | * | 10/1993 | Ruetz | F01D 25/164 |
| | | | | 384/473 |
| 5,977,677 A | * | 11/1999 | Henry | F16C 39/02 |
| | | | | 310/90.5 |
| 7,104,693 B2 | * | 9/2006 | Mavrosakis | F16C 27/045 |
| | | | | 384/99 |
| 9,212,698 B2 | * | 12/2015 | Schmidt | F16C 27/045 |
| 9,234,542 B2 | * | 1/2016 | McKeirnan, Jr. | F01D 25/18 |
| 9,534,629 B1 | | 1/2017 | Lucas et al. | |
| 9,963,998 B2 | * | 5/2018 | Marsal | F01D 25/162 |
| 10,132,350 B2 | * | 11/2018 | Schmidt | F16C 35/067 |
| 10,184,515 B2 | * | 1/2019 | Matsunaga | F16C 33/6662 |
| 10,316,691 B2 | * | 6/2019 | Murayama | F04D 29/0563 |
| 10,697,322 B2 | * | 6/2020 | Hauvespre | F16C 33/6681 |
| 2009/0193840 A1 | | 8/2009 | Kurihara et al. | |
| 2018/0080499 A1 | | 3/2018 | An et al. | |
| 2018/0119572 A1 | | 5/2018 | Uneura | |
| 2018/0355758 A1 | * | 12/2018 | Hauvespre | F16C 33/414 |

FOREIGN PATENT DOCUMENTS

| | | | | |
|---|---|---|---|---|
| CN | 107532652 A | | 1/2018 | |
| CN | 107835905 A | | 3/2018 | |
| EP | 2 279 352 B1 | | 3/2016 | |
| EP | 3 306 126 A1 | | 4/2018 | |
| JP | 02-087933 U | | 7/1990 | |
| JP | 04-159421 A | | 6/1992 | |
| JP | 06-001737 U | | 1/1994 | |
| JP | 06-040908 Y2 | | 10/1994 | |
| JP | 08-261230 A | | 10/1996 | |
| JP | 2701527 B2 | | 1/1998 | |
| JP | 2002-372054 A | | 12/2002 | |
| JP | 2004-108450 A | | 4/2004 | |
| JP | 2005171796 A | * | 6/2005 | ............ F16C 19/548 |
| JP | 2005-240978 A | | 9/2005 | |
| JP | 2007-071356 A | | 3/2007 | |
| JP | 2009-185715 A | | 8/2009 | |
| JP | 2009-264526 A | | 11/2009 | |
| JP | 2013-124647 A | | 6/2013 | |
| WO | WO 2009/133445 A1 | | 11/2009 | |
| WO | WO 2016/194198 A1 | | 12/2016 | |
| WO | WO 2017/006865 A1 | | 1/2017 | |

OTHER PUBLICATIONS

International Search Report dated Feb. 12, 2019 in PCT/JP2018/043076 filed on Nov. 21, 2018 (with English Translation), 4 pages.
Combined Chinese Office Action and Search Report dated Jun. 3, 2021 in Chinese Patent Application No. 201880081378.5 (with English translation of Categories of Cited Documents), 9 pages.

* cited by examiner

TURBOCHARGER

CROSS REFERENCE TO RELATED APPLICATIONS

This application is a continuation application of International Application No. PCT/JP2018/043076, filed on Nov. 21, 2018, which claims priority to Japanese Patent Application No. 2018-000127, filed on Jan. 4, 2018, the entire contents of which are incorporated by reference herein.

BACKGROUND ART

Technical Field

The present disclosure relates to a turbocharger.

Related Art

A turbocharger includes a housing having a bearing hole. In a turbocharger described in Patent Literature 1, an annular case portion is arranged in a bearing hole. A pair of ball bearings are assembled to an inside of the case portion. A damper portion is formed in an outer peripheral surface of the case portion. The damper portion suppresses vibration of a shaft through use of lubricating oil supplied between the shaft and the bearing hole.

CITATION LIST

Patent Literature

Patent Literature 1: JP 2009-264526 A1

SUMMARY

Technical Problem

The configuration in which the ball bearings are assembled to the case portion increases a cost required for machining and assembly work for the case portion.

The present disclosure has an object to provide a turbocharger capable of achieving a cost reduction.

Solution to Problem

In order to solve the above-mentioned problem, according to one mode of the present disclosure, there is provided a turbocharger, including: a housing having a bearing hole; a shaft having a turbine impeller provided at one end and a compressor impeller provided at another end; a ball bearing, which has an inner ring mounted to the shaft, and an outer ring provided so as to be relatively rotatable in the bearing hole; and a damper portion, which is formed in at least one of an outer peripheral surface of the outer ring and an opposed surface of an inner peripheral surface of the bearing hole opposed to the outer peripheral surface.

The ball bearing may include a pair of angular contact bearings provided in the bearing hole in a face-to-face duplex combination.

A groove passing through the outer ring of one or each of the pair of angular contact bearings from the outer peripheral surface to the inner peripheral surface may be formed in an outside surface located toward a direction in which the pair of angular contact bearings are spaced apart from each other.

The groove may be inclined with respect to a radial direction of the outer ring.

The angular contact bearing may include a retainer configured to retain rolling elements provided between the outer ring and the inner ring, and a bottom surface of the groove formed in the outside surface is located on the side of the outside surface including the groove with respect to the retainer.

The shaft may include: a small-diameter portion to which the inner ring is mounted; and a large-diameter portion, which has a diameter larger than a diameter of the small-diameter portion, and is formed integrally with the shaft, or formed of a separate member attached to the shaft. The large-diameter portion may include a large-diameter end surface opposed to the inner ring. The large-diameter portion may include an inclined portion having an outer diameter decreasing toward the large-diameter end surface.

The inner ring may include an inner ring end surface opposed to the large-diameter end surface. The inner ring may include an inclined portion having an outer diameter decreasing toward the inner ring end surface. An outer diameter of the inner ring end surface may be equal to an outer diameter of the large-diameter end surface.

The ball bearing may include a pair of angular contact bearings. The damper portion may include a first protrusion and a second protrusion, and the second protrusion is located toward a direction in which the pair of angular contact bearings approach each other with respect to the first protrusion, and has a width larger than a width of the first protrusion.

The first protrusion or the second protrusion may be formed on an extension of a center line indicating a contact angle of the angular contact bearing.

Effects of Disclosure

According to the present disclosure, the cost reduction of the turbocharger can be achieved.

DESCRIPTION OF EMBODIMENTS

Figure 1:
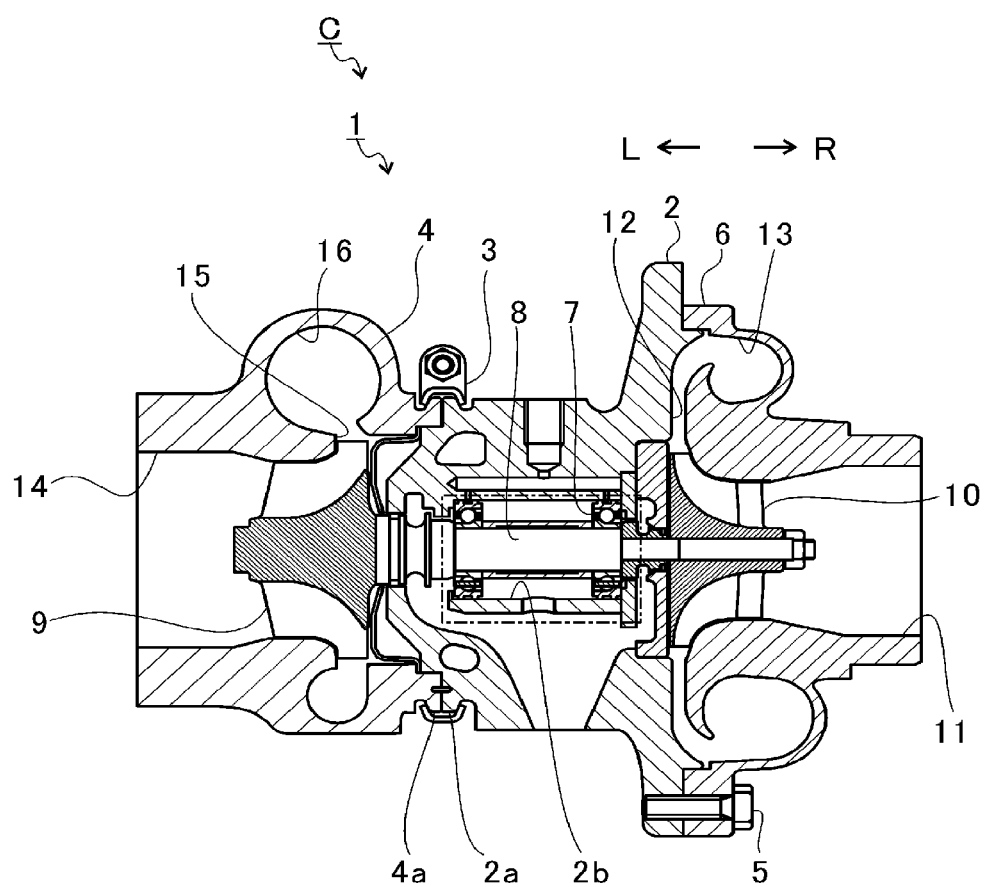
FIG. 1 is a schematic sectional view for illustrating a turbocharger.

Now, with reference to the attached drawings, one embodiment of the present disclosure is described. The dimensions, materials, and other specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Illustration of elements with no direct relationship to the present disclosure is omitted.

FIG. 1 is a schematic sectional view for illustrating a turbocharger C. In the following, a direction indicated by the arrow L illustrated in FIG. 1 corresponds to a left side of the turbocharger C. A direction indicated by the arrow R illustrated in FIG. 1 corresponds to a right side of the turbocharger C. As illustrated in FIG. 1, the turbocharger C includes a turbocharger main body 1. The turbocharger main body 1 is formed of a bearing housing (housing) 2, a turbine housing 4, and a compressor housing 6. The turbine housing 4 is coupled to a left side of the bearing housing 2 by a fastening mechanism 3. The compressor housing 6 is coupled to a right side of the bearing housing 2 by fastening bolts 5.

A protrusion 2a is formed on an outer peripheral surface of the bearing housing 2. The protrusion 2a is formed on the turbine housing 4 side. The protrusion 2a protrudes in a radial direction of the bearing housing 2. A protrusion 4a is formed on an outer peripheral surface of the bearing housing 4. The protrusion 4a is formed on the bearing housing 2 side. The protrusion 4a protrudes in a radial direction of the turbine housing 4. The protrusions 2a and 4a are band-fastened by the fastening mechanism 3. The fastening mechanism 3 is formed of a G coupling configured to clamp the protrusions 2a and 4a.

A bearing hole 2b is formed in the bearing housing 2. The bearing hole 2b passes through the bearing housing 2 in a right-and-left direction of the turbocharger C. The bearing hole 2b is configured to accommodate a part of the shaft 8. A pair of ball bearings 7 are mounted to the shaft 8. The pair of ball bearings 7 are accommodated in the bearing hole 2b. The shaft 8 is axially supported by the pair of ball bearings 7 so that the shaft 8 is rotatable. A turbine impeller 9 is provided at a left end portion (one end) of the shaft 8. The turbine impeller 9 is accommodated in the turbine housing 4 so as to be rotatable. A compressor impeller 10 is provided at a right end portion (another end) of the shaft 8. The compressor impeller 10 is accommodated in the compressor housing 6 so as to be rotatable.

An intake port 11 is formed in the compressor housing 6. The intake port 11 is opened on the right side of the turbocharger C. The intake port 11 is connected to an air cleaner (not shown). A diffuser flow passage 12 is defined by the opposed surfaces of the bearing housing 2 and the compressor housing 6. The diffuser flow passage 12 increases pressure of air. The diffuser flow passage 12 has an annular shape defined so as to extend from an inner side toward an outer side in a radial direction of the shaft 8. The diffuser flow passage 12 communicates with the intake port 11 on a radially inner side through intermediation of the compressor impeller 10.

A compressor scroll flow passage 13 is formed in the compressor housing 6. The compressor scroll flow passage 13 has an annular shape. The compressor scroll flow passage 13 is located, for example, on an outer side with respect to the diffuser flow passage 12 in a radial direction of the shaft 8. The compressor scroll flow passage 13 communicates with an intake port of an engine (not shown) and the diffuser flow passage 12. When the compressor impeller 10 rotates, the air is sucked from the intake port 11 into the compressor housing 6. The sucked air is pressurized and accelerated in the course of flowing through blades of the compressor impeller 10. The air having been pressurized and accelerated is increased in pressure in the diffuser flow passage 12 and the compressor scroll flow passage 13. The air having been increased in pressure is led to the intake port of the engine.

A discharge port 14 is formed in the turbine housing 4. The discharge port 14 is opened on the left side of the turbocharger C. The discharge port 14 is connected to an exhaust gas purification device (not shown). A connection passage 15 and a turbine scroll flow passage 16 are formed in the turbine housing 4. The turbine scroll flow passage 16 has an annular shape. The turbine scroll flow passage 16 is located, for example, on an outer side with respect to the connection passage 15 in a radial direction of the turbine impeller 9. The turbine scroll flow passage 16 communicates with a gas inflow port (not shown). Exhaust gas discharged from an exhaust manifold (not shown) of the engine is led to the gas inflow port. The connection passage 15 connects the turbine scroll flow passage 16 and the discharge port 14 to each other. Thus, the exhaust gas having been led from the gas inflow port to the turbine scroll flow passage 16 is led to the discharge port 14 through the connection passage 15 and the turbine impeller 9. The exhaust gas led to the discharge port 14 rotates the turbine impeller 9 in the course of flowing.

A rotational force of the turbine impeller 9 is transmitted to the compressor impeller 10 through the shaft 8. When the compressor impeller 10 rotates, the pressure of the air is increased as described above. In such a manner, the air is led to the intake port of the engine.

Figure 2:
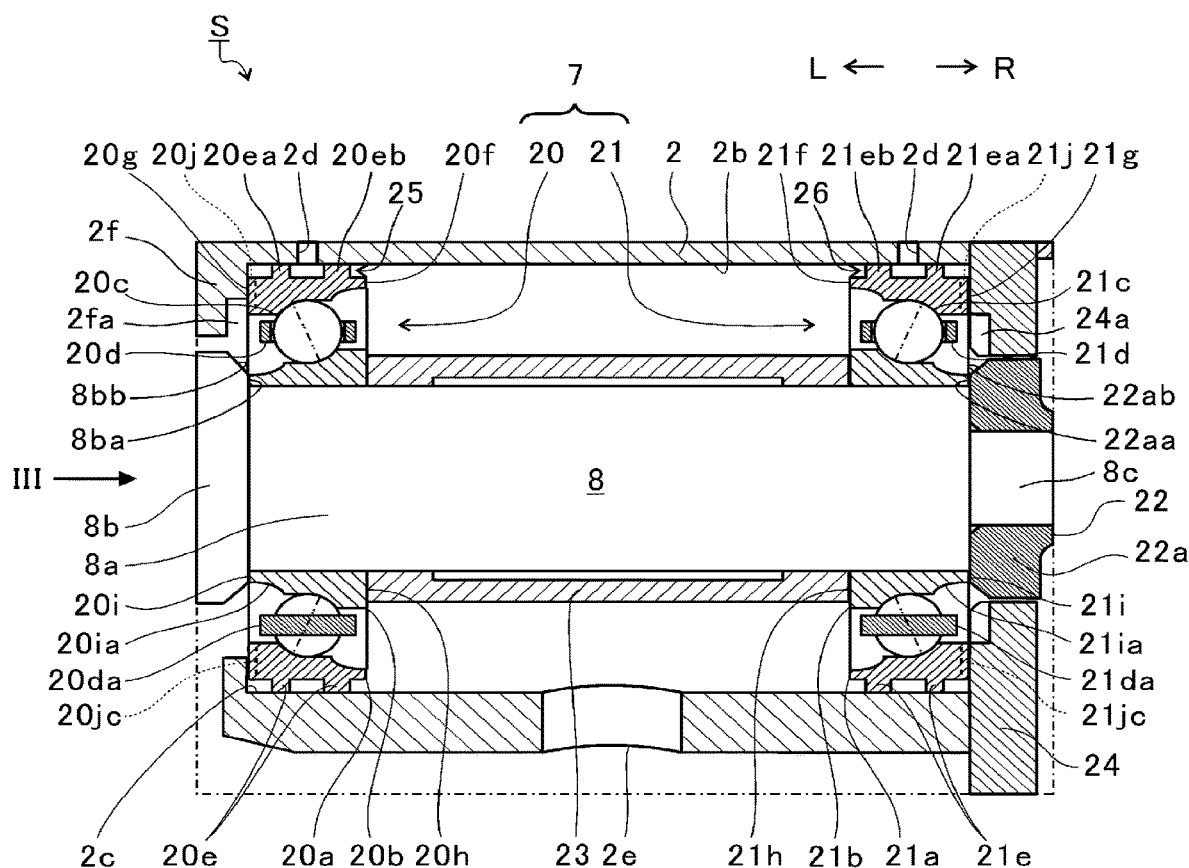
FIG. 2 is an extracted view for illustrating a portion indicated by one-dot chain lines of FIG. 1.

FIG. 2 is an extracted view for illustrating a portion indicated by one-dot chain lines of FIG. 1. As illustrated in FIG. 2, the bearing housing 2 has a bearing structure S. The bearing structure S includes the bearing hole 2b, the pair of ball bearings 7, and the shaft 8. The two (pair of) ball bearings 7 are arranged in the bearing hole 2b. The two ball bearings 7 are spaced apart from each other in an axial direction of the shaft 8 (hereinafter simply referred to as "axial direction").

In the following, when the two ball bearings 7 are distinguished and referred to, the ball bearing 7 on a left side of FIG. 2 (turbine impeller 9 side) is referred to as "turbine-side bearing 20". The ball bearing 7 on a right side of FIG. 2 (compressor impeller 10 side) is referred to as "compressor-side bearing 21".

The turbine-side bearing 20 includes an outer ring 20a, an inner ring 20b, rolling elements 20c, and a retainer 20d. The inner ring 20b is mounted to an outer peripheral surface of the shaft 8. The inner ring 20b rotates integrally with the shaft 8. The outer ring 20a is provided on a radially outer side of the inner ring 20b. The outer ring 20a is arranged so as to be opposed to an inner peripheral surface 2c of the bearing hole 2b. A damper portion 25 described later is formed in an outer peripheral surface of the outer ring 20a. A plurality of rolling elements 20c are arranged between the outer ring 20a and the inner ring 20b. The retainer 20d is configured to retain the plurality of rolling elements 20c. Intervals of the plurality of rolling elements 20c in a circumferential direction are maintained at predetermined intervals by the retainer 20d.

The compressor-side bearing 21 includes an outer ring 21a, an inner ring 21b, rolling elements 21c, and a retainer 21d. The inner ring 21b is mounted to an outer peripheral surface of the shaft 8. The inner ring 21b rotates integrally with the shaft 8. The outer ring 21a is provided on a radially outer side of the inner ring 21b. The outer ring 21a is arranged so as to be opposed to an inner peripheral surface 2c of the bearing hole 2b. A damper portion 26 described later is formed in an outer peripheral surface of the outer ring 21a. A plurality of rolling elements 21c are arranged between the outer ring 21a and the inner ring 21b. The retainer 21d is configured to retain the plurality of rolling elements 21c. Intervals of the plurality of rolling elements 21c in a circumferential direction are maintained at predetermined intervals by the retainer 21d.

In this embodiment, the pair of ball bearings 7 are a pair of angular contact bearings. In FIG. 2, center lines (hereinafter also referred to as "connection lines") representing contact angles of the angular contact bearings are indicated by two-dot chain lines. The connection line is inclined (form a contact angle) with respect to a line (plane) perpendicular to the axial direction of the shaft 8. The connection line is a line that connects a position at which each of the outer rings 20a and 21a of the ball bearings 7 is closest to each of the rolling elements 20c and 21c and a position at which each of the inner rings 20b and 21b is closest to each of the rolling elements 20c and 21c with each other. In other words, the connection line is a line that connects a contact point between each of the outer rings 20a and 21a and each of the rolling elements 20c and 21c and a contact point between each of the inner rings 20b and 21b and each of the rolling elements 20c and 21c to each other. The pair of angular contact bearings are capable of receiving thrust loads in addition to radial loads of the shaft 8. Directions in which the pair of angular contact bearings respectively receive the thrust loads are opposite to each other.

As indicated by the two-dot chain lines of FIG. 2, each of the connection lines of the turbine-side bearing 20 is inclined with respect to the line perpendicular to the axial direction of the shaft 8 in a direction in which the connection line separates away from the compressor-side bearing 21 as approaching an outer side in a radial direction of the shaft 8 (hereinafter simply referred to as "radial direction"). As indicated by the two-dot chain lines of FIG. 2, each of the connection lines of the compressor-side bearing 21 is inclined with respect to the line perpendicular to the axial direction of the shaft 8 in a direction in which the connection line separates away from the turbine-side bearing 20 as approaching the outer side in the radial direction of the shaft 8. In this embodiment, the pair of angular contact bearings are arranged in the bearing hole 2b in a so-called face-to-face duplex combination (combination in which the contact angles form directions of lines separating away from each other toward the outer ring side).

The position at which the inner ring 20b is closest to the rolling element 20c is located on the compressor impeller 10 side with respect to a center of the inner ring 20b in the axial direction. The position at which the outer ring 20a is closest to the rolling element 20c is located on the turbine impeller 9 side with respect to a center of the outer ring 20a in the axial direction. The position at which the inner ring 21b is closest to the rolling element 21c is located on the compressor impeller 9 side with respect to a center of the inner ring 21b in the axial direction. The position at which the outer ring 21a is closest to the rolling element 21c is located on the turbine impeller 10 side with respect to a center of the outer ring 21a in the axial direction.

The outer ring 20a has different thicknesses (thicknesses in the radial direction of the shaft 8) at both end surfaces in the axial direction. The outer ring 20a includes an end surface (thick-side end surface) 20g on the turbine impeller 9 side and an end surface (thin-side end surface) 20f on the compressor impeller 10 side. The end surface 20g has a thickness larger than that of the end surface 20f. In other words, the end surface 20f has a thickness smaller than that of the end surface 20g.

The inner ring 20b has different thicknesses (thicknesses in the radial direction of the shaft 8) at both end surfaces in the axial direction. The inner ring 20b includes an end surface (thick-side end surface) 20h on the compressor impeller 10 side and an end surface (thin-side end surface) 20i on the turbine impeller 9 side. The end surface 20h has a thickness larger than that of the end surface 20i. In other words, the end surface 20i has a thickness smaller than that of the end surface 20h. The outer diameter of the inner ring 20b increases from the turbine impeller 9 side toward the compressor impeller 10 side. The inner diameter of the outer ring 20a increases from the turbine impeller 9 side toward the compressor impeller 10 side.

However, the above-mentioned configuration that the thicknesses are different at the both end surfaces in the axial direction may be applied only to any one of the outer ring 20a and the inner ring 20b. For example, the both end surfaces of the outer ring 20a in the axial direction may have different thicknesses, and the both end surfaces of the inner ring 20b in the axial direction may have the same thickness. Moreover, the both end surfaces of the inner ring 20b in the axial direction may have different thicknesses, and the both end surfaces of the outer ring 20a in the axial direction may have the same thickness.

The outer ring 21a has different thicknesses (thicknesses in the radial direction of the shaft 8) at both end surfaces in the axial direction. The outer ring 21a includes an end surface (thick-side end surface) 21g on the compressor impeller 10 side and an end surface (thin-side end surface) 21f on the turbine impeller 9 side. The end surface 21g has a thickness larger than that of the end surface 21f. In other words, the end surface 21f has a thickness smaller than that of the end surface 21g.

The inner ring 21b has different thicknesses (thicknesses in the radial direction of the shaft 8) at both end surfaces in the axial direction. The inner ring 21b includes an end surface (thick-side end surface) 21h on the turbine impeller 9 side and an end surface (thin-side end surface) 21i on the compressor impeller 10 side. The end surface 21h has a thickness larger than that of the end surface 21i. In other words, the end surface 21i has a thickness smaller than that of the end surface 21h. The outer diameter of the inner ring 21b increases from the compressor impeller 10 side toward the turbine impeller 9 side. The inner diameter of the outer ring 21a increases from the compressor impeller 10 side toward the turbine impeller 9 side.

However, the above-mentioned configuration that the thicknesses are different at the both end surfaces in the axial direction may be applied only to any one of the outer ring 21a and the inner ring 21b. For example, the both end surfaces of the outer ring 21a in the axial direction may have different in thicknesses, and the both end surfaces of the inner ring 21b in the axial direction may have the same thickness. Moreover, the both end surfaces of the inner ring 21b in the axial direction may have different in thicknesses, and the both end surfaces of the outer ring 21a in the axial direction may have the same thickness.

Grooves 20j are formed in the end surface (outside surface) 20g of the outer ring 20a. The end surface 20g is located on the outer ring 20a toward a direction in which the pair of ball bearings 7 are spaced apart from each other. The grooves 20j pass through the outer ring 20a from the outer peripheral surface to the inner peripheral surface. Grooves 21j are formed in the end surface (outside surface) 21g of the outer ring 21a. The end surface 21g is located on the outer ring 21a toward a direction in which the pair of ball bearings 7 are spaced apart from each other. The grooves 21j pass through the outer ring 21a from the outer peripheral surface to the inner peripheral surface. However, it is not always required that the grooves 20j and 21j be formed in both of the outer rings 20a and 21a. For example, the outer ring 20a may include the grooves 20*j*, and it is not required that the outer ring 21*a* include the grooves 21*j*. Moreover, the outer ring 20*a* may include the grooves 20*j*, and the outer ring 21*a* may include the grooves 21*j*. That is, it is only required that, in the outer rings 20*a* and 21*a* of any one or both of the pair of angular contact bearings, the grooves 20*j* and 21*j* be formed in the end surfaces (outside surfaces) 20*g* and 21*g* located in the directions in which the pair of angular contact bearings are spaced apart from each other. Moreover, it is not always required that the grooves 20*j* and 21*j* be formed in the outer rings 20*a* and 21*a*.

Figure 3:
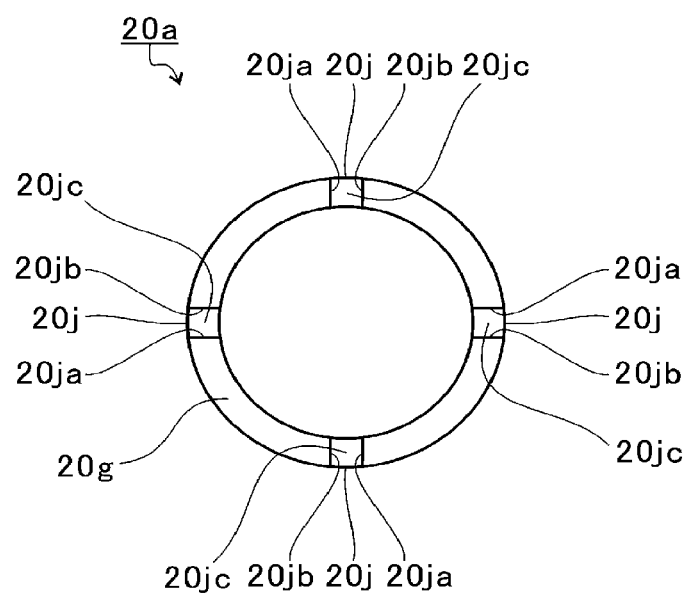
FIG. 3 is an explanatory view for illustrating a shape of grooves in an outer ring in an embodiment.

FIG. 3 is an explanatory view for illustrating a shape of the grooves 20*j* in the outer ring 20*a* in this embodiment. FIG. 3 is a sectional view of the outer ring 20*a* of FIG. 2 as seen in the direction indicated by the arrow III. A shape of the grooves 21*j* in the outer ring 21*a* is the same as the shape of the grooves 20*j* in the outer ring 20*a*. Therefore, a description is now given of the shape of the grooves 20*j* in the outer ring 20*a*, and a description of the shape of the grooves 21*j* in the outer ring 21*a* is omitted.

As illustrated in FIG. 3, the groove 20*j* extends along the radial direction of the outer ring 20*a* (or the shaft 8). The groove 20*j* includes a left-side surface 20*ja*, a right-side surface 20*jb*, and a bottom surface 20*jc*. The left-side surface 20*ja* and the right-side surface 20*jb* extend along the radial direction of the outer ring 20*a* (or the shaft 8). The bottom surface 20*jc* is a flat surface parallel with the radial direction of the outer ring 20*a* (or the shaft 8) and parallel with the end surface 20*g*.

A width of the groove 20*j* in the circumferential direction (that is, a distance between the left-side surface 20*ja* and the right-side surface 20*jb*) is constant irrespective of a position in the radial direction. However, the width of the groove 20*j* in the circumferential direction may be changed in accordance with the position in the radial direction. For example, the width of the groove 20*j* in the circumferential direction may be changed so as to decrease from the radially inner side toward the radially outer side. Moreover, the width of the groove 20*j* in the circumferential direction may be changed so as to increase from the radially inner side toward the radially outer side. A plurality of grooves 20*j* are formed in the circumferential direction of the end surface 20*g*. In this embodiment, four grooves 20*j* are arranged at intervals of 90° in the circumferential direction of the end surface 20*g*. However, the number of the grooves 20*j* is not limited to four, and it is only required that the number of the grooves 20*j* be one or more. Moreover, the intervals of the grooves 20*j* in the circumferential direction are not limited to the equal intervals, and may be unequal intervals.

Returning to FIG. 2, the bottom surface 20*jc* is formed on the turbine impeller 9 side with respect to an end surface 20*da* of the retainer 20*d* closest to the turbine impeller 9 side in the axial direction of the shaft 8. Similarly, the bottom surface 21*jc* of the groove 21*j* is formed on the compressor impeller 10 side with respect to an end surface 21*da* of the retainer 21*d* closest to the compressor impeller 10 side in the axial direction of the shaft 8. That is, the bottom surface 20*jc* is located on the side of the end surface 20*g* in which the grooves 20*j* are formed (outside-surface side) with respect to the retainer 20*d*. Moreover, the bottom surface 21*jc* is located on the side of the end surface 21*g* in which the grooves 21*j* are formed (outside-surface side) with respect to the retainer 21*d*. In other words, positions of the grooves 20*j* and 21*j* in the axial direction do not overlap (are completely displaced from) positions of the retainers 20*d* and 21*d*.

Figure 4:
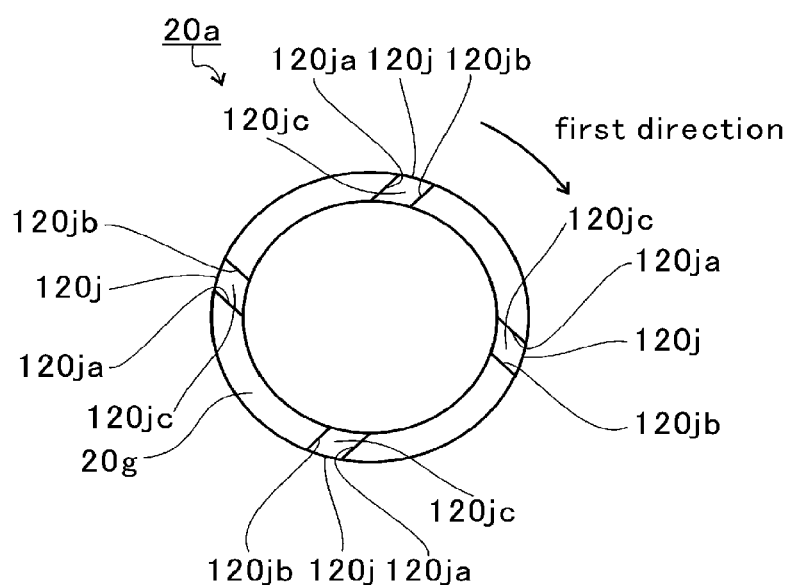
FIG. 4 is an explanatory view for illustrating a shape of grooves in the outer ring in a first modification example.

FIG. 4 is an explanatory view for illustrating a shape of grooves 120*j* in the outer ring 20*a* in a first modification example. As illustrated in FIG. 4, the groove 120*j* extends in a direction inclined with respect to the radial direction of the outer ring 20*a* (or the shaft 8). The groove 120*j* includes a left-side surface 120*ja*, a right-side surface 120*jb*, and a bottom surface 120*jc*. The left-side surface 120*ja* and the right-side surface 120*jb* are inclined with respect to the radial direction of the outer ring 20*a* (or the shaft 8). The bottom surface 120*jc* is a flat surface parallel with the end surface 20*g*. The position of the bottom surface 120*jc* in the axial direction is the same as the position of the bottom surface 20*jc* in the axial direction. In this description, meaning of "same" includes a case of being completely the same and a case of deviating from the state of being completely the same within a range of an allowable error (machining precisions, assembly errors, and the like).

For example, as illustrated in FIG. 4, when the outer ring 20*a* rotates in a clockwise direction of FIG. 4 (in a first direction of FIG. 4), each of the grooves 120*j* has a shape of inclining toward the first direction side from the radially inner side toward the radially outer side with respect to the radial direction of the end surface 20*g*. That is, each of the left-side surface 120*ja* and the right-side surface 120*jb* has a shape of inclining toward the first direction side from the radially inner side toward the radially outer side with respect to the radial direction of the end surface 20*g*.

A width of the groove 120*j* in the circumferential direction (that is, a distance between the left-side surface 120*ja* and the right-side surface 120*jb*) is constant irrespective of a position in the radial direction. However, the width of the groove 120*j* in the circumferential direction may be changed in accordance with the position in the radial direction. For example, the width of the groove 120*j* in the circumferential direction may be changed so as to decrease from the radially inner side toward the radially outer side. Moreover, the width of the groove 120*j* in the circumferential direction may be changed so as to increase from the radially inner side toward the radially outer side. A plurality of grooves 120*j* are formed in the circumferential direction of the end surface 20*g*. In the first modification example, four grooves 120*j* are arranged at intervals of 90° in the circumferential direction of the end surface 20*g*. However, the number of the grooves 120*j* is not limited to four, and it is only required that the number of the grooves 120*j* be one or more. Moreover, the intervals of the grooves 120*j* in the circumferential direction are not limited to the equal intervals, and may be unequal intervals. The rotation direction of the outer ring 20*a* may be a second direction opposite to the first direction. In this case, the groove 120*j* has a shape of inclining toward the second direction side from the radially inner side toward the radially outer side with respect to the radial direction of the end surface 20*g*.

Figure 5:
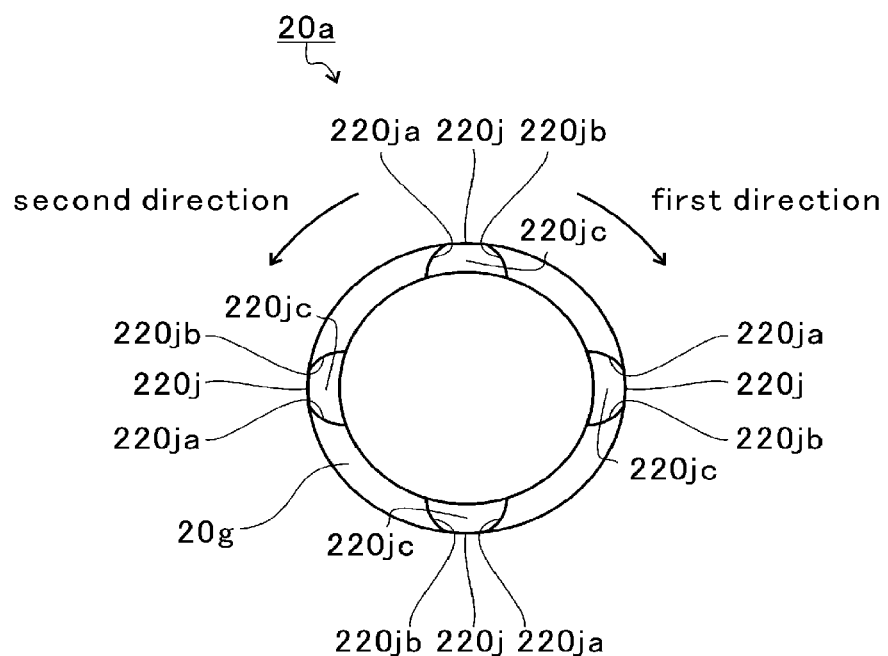
FIG. 5 is an explanatory view for illustrating a shape of grooves in the outer ring in a second modification example.

FIG. 5 is an explanatory view for illustrating a shape of grooves 220*j* in the outer ring 20*a* in a second modification example. As illustrated in FIG. 5, the groove 220*j* has an approximately semicircular shape. The groove 220*j* includes a left-side surface 220*ja*, a right-side surface 220*jb*, and a bottom surface 220*jc*. The left-side surface 220*ja* and the right-side surface 220*jb* are curved.

Specifically, the left-side surface 220*ja* has a shape of inclining toward a first direction (a clockwise direction of FIG. 5) side from the radially inner side toward the radially outer side with respect to the radial direction of the end surface 20*g*. The right-side surface 220*jb* has a shape of inclining toward a second direction (a counterclockwise direction of FIG. 5) side from the radially inner side toward the radially outer side with respect to the radial direction of the end surface 20*g*. The position of the bottom surface 220$jc$ in the axial direction is the same as the position of the bottom surface 20$jc$ in the axial direction. In this description, meaning of "same" includes a case of being completely the same and a case of deviating from the state of being completely the same within a range of an allowable error (machining precisions, assembly errors, and the like).

A width of the groove 220$j$ in the circumferential direction (that is, a distance between the left-side surface 220$ja$ and the right-side surface 220$jb$) decreases from the radially inner side toward the radially outer side. A change amount of the width of the groove 220$j$ in the circumferential direction is larger on the radially outer side than on the radially inner side. However, the change amount of the width of the groove 220$j$ in the circumferential direction may be constant in the radial direction. A plurality of grooves 220$j$ are formed in the circumferential direction of the end surface 20$g$. In the second modification example, four grooves 220$j$ are arranged at intervals of 90° in the circumferential direction of the end surface 20$g$. However, the number of the grooves 220$j$ is not limited to four, and it is only required that the number of the grooves 220$j$ be one or more. Moreover, the intervals of the grooves 220$j$ in the circumferential direction are not limited to the equal intervals, and may be unequal intervals. In FIG. 5, the left-side surface 220$ja$ and the right-side surface 220$jb$ are formed into the curved shapes. However, the left-side surface 220$ja$ and the right-side surface 220$jb$ may have flat shapes.

Returning to FIG. 2, the damper portion 25 is formed in the outer peripheral surface of the turbine-side bearing 20 (outer ring 20$a$). The damper portion 25 is configured to suppress vibration of the shaft 8 thorough use of lubricating oil supplied between the shaft 8 and the inner peripheral surface 2$c$ of the bearing hole 2$b$. In this embodiment, the damper portion 25 includes two annular protrusions 20$e$. The two annular protrusions 20$e$ are arranged in the outer peripheral surface of the outer ring 20$a$ so as to be spaced apart from each other in the axial direction. The two annular protrusions 20$e$ protrude in the radial direction of the shaft 8. Each of the two annular protrusions 20$e$ extends in an annular shape over the entire circumference of the outer peripheral surface of the outer ring 20$a$.

The damper portion 26 is formed in the outer peripheral surface of the compressor-side bearing 21 (outer ring 21$a$). The damper portion 26 is configured to suppress vibration of the shaft 8 thorough use of lubricating oil supplied between the shaft 8 and the inner peripheral surface 2$c$ of the bearing hole 2$b$. In this embodiment, the damper portion 26 includes two annular protrusions 21$e$. The two annular protrusions 21$e$ are arranged in the outer peripheral surface of the outer ring 21$a$ so as to be spaced apart from each other in the axial direction. The two annular protrusions 21$e$ protrude in the radial direction of the shaft 8. Each of the two annular protrusions 21$e$ extends in an annular shape over the entire circumference of the outer peripheral surface of the outer ring 21$a$.

The two annular protrusions 20$e$ are spaced apart from the inner peripheral surface 2$c$ of the bearing hole 2$b$. An oil hole 2$d$ is formed between portions of the inner peripheral surface 2$c$ of the bearing hole 2$b$ opposed to the two annular protrusions 20$e$. The oil hole 2$d$ is located on a top side in the vertical direction (the top side of FIG. 2) with respect to the shaft 8. The oil hole 2$d$ communicates with the outside of the bearing housing 2. The lubricating oil fed out from an oil pump (not shown) is supplied from the oil hole 2$d$ into the bearing hole 2$b$, and lubricates the pair of ball bearings 7.

The two annular protrusions 21$e$ are spaced apart from the inner peripheral surface 2$c$ of the bearing hole 2$b$. An oil hole 2$d$ is formed between portions of the inner peripheral surface 2$c$ of the bearing hole 2$b$ opposed to the two annular protrusions 21$e$. The oil hole 2$d$ is located on a top side in the vertical direction (the top side of FIG. 2) with respect to the shaft 8. The oil hole 2$d$ communicates with the outside of the bearing housing 2. The lubricating oil fed out from an oil pump (not shown) is supplied from the oil hole 2$d$ into the bearing hole 2$b$, and lubricates the pair of ball bearings 7.

The annular protrusion on the turbine impeller 9 side of the two annular protrusions 20$e$ is referred to as "first protrusion 20$ea$". The annular protrusion on the compressor impeller 10 side of the two annular protrusions 20$e$ is referred to as "second protrusion 20$eb$". That is, the second protrusion 20$eb$ is located toward a direction in which the pair of angular contact bearings approach each other with respect to the first protrusion 20$ea$. A width of the first protrusion 20$ea$ in the axial direction is smaller than a width of the second protrusion 20$eb$ in the axial direction.

The annular protrusion on the compressor impeller 10 side of the two annular protrusions 21$e$ is referred to as "first protrusion 21$ea$". The annular protrusion on the turbine impeller 9 side of the two annular protrusions 21$e$ is referred to as "second protrusion 21$eb$". That is, the second protrusion 21$eb$ is located toward a direction in which the pair of angular contact bearings approach each other with respect to the first protrusion 21$ea$. A width of the first protrusion 21$ea$ in the axial direction is smaller than a width of the second protrusion 21$eb$ in the axial direction.

However, the width of the first protrusion 21$ea$ in the axial direction may be equal to or larger than the width of the second protrusion 21$eb$ in the axial direction. Moreover, the width of the first protrusion 20$ea$ in the axial direction may be equal to or larger than the width of the second protrusion 20$eb$ in the axial direction.

The first protrusion 20$ea$ is formed on an extension of a center line (namely, a connection line) indicating a contact angle of the angular contact bearing. However, the second protrusion 20$eb$ may be formed on the extension of the connection line. A space between the first protrusion 20$ea$ and the second protrusion 20$eb$ may be formed on the extension of the connection line. In other words, the damper portion 25 may be formed on the extension of the connection line.

The first protrusion 21$ea$ is formed on an extension of a center line (namely, a connection line) indicating a contact angle of the angular contact bearing. However, the second protrusion 21$eb$ may be formed on the extension of the connection line. A space between the first protrusion 21$ea$ and the second protrusion 21$eb$ may be formed on the extension of the connection line. In other words, the damper portion 26 may be formed on the extension of the connection line.

A description has been given of the example in which the damper portions 25 and 26 are formed respectively in the outer peripheral surfaces of the outer rings 20$a$ and 21$a$. However, the configuration is not limited to this example, and the damper portions 25 and 26 may be formed in the inner peripheral surface 2$c$ of the bearing hole 2$b$ of the bearing housing 2.

Figure 6:
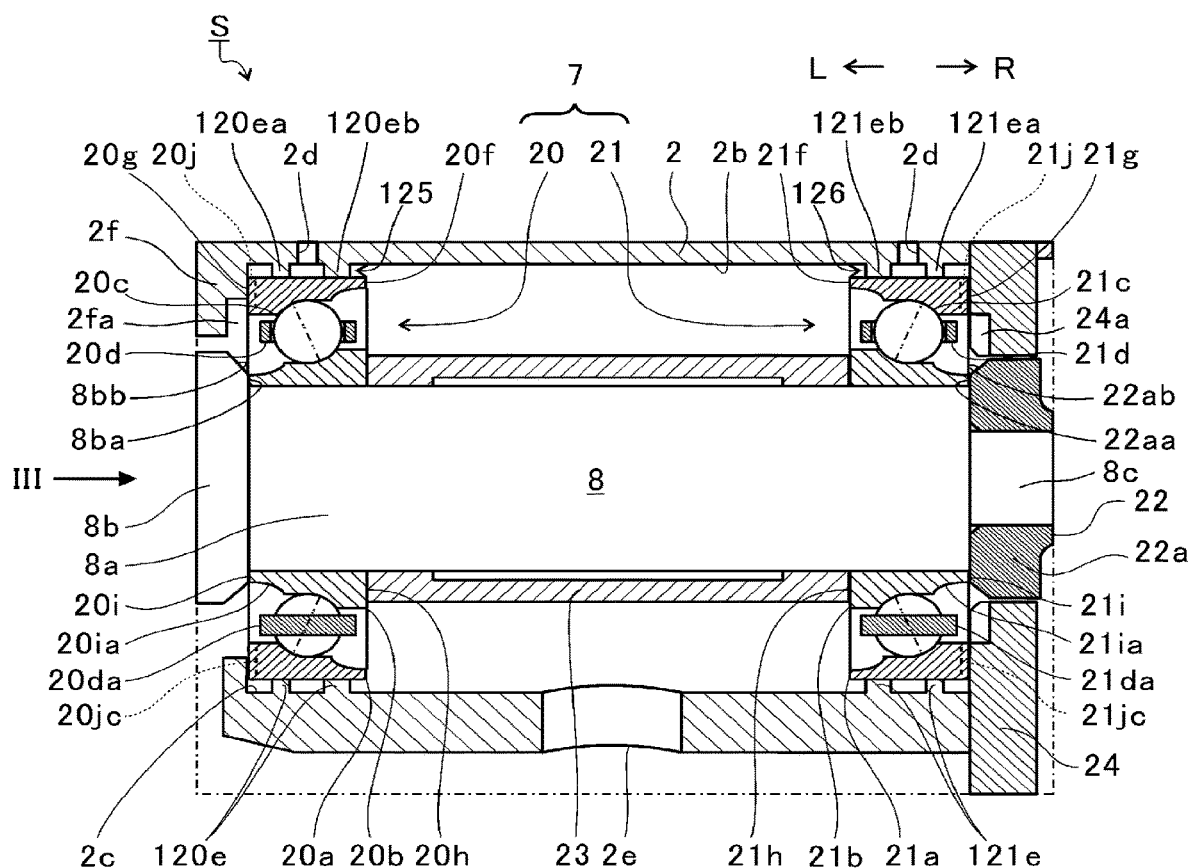
FIG. 6 is a view for illustrating an example in which damper portions are formed in an inner peripheral surface of a bearing hole.

FIG. 6 is a view for illustrating an example in which damper portions 125 and 126 are formed in the inner peripheral surface 2$c$ of the bearing hole 2$b$. As illustrated in FIG. 6, the two annular protrusions 20$e$ (see FIG. 2) are not formed in the outer peripheral surface of the outer ring 20$a$.

Moreover, the two annular protrusions 21e (see FIG. 2) are not formed in the outer peripheral surface of the outer ring 21a. The outer peripheral surfaces of the outer rings 20a and 21a respectively have approximately cylindrical shapes.

Meanwhile, the damper portions 125 and 126 are formed in the inner peripheral surface 2c of the bearing hole 2b. The damper portion 125 is formed at a position (opposed surface) of the inner peripheral surface 2c of the bearing hole 2b opposed to the outer peripheral surface of the outer ring 20a. The damper portion 126 is formed at a position of the inner peripheral surface 2c of the bearing hole 2b opposed to the outer peripheral surface of the outer ring 21a. The damper portions 125 and 126 are configured to suppress the vibration of the shaft 8 through use of the lubricating oil supplied between the shaft 8 and the outer rings 20a and 21a.

The damper portion 125 includes two annular protrusions 120e. The two annular protrusions 120e are arranged in the inner peripheral surface 2c of the bearing hole 2b so as to be spaced apart from each other in the axial direction. The two annular protrusions 120e protrude in the radial direction of the shaft 8. Each of the two annular protrusions 120e extends in an annular shape over the entire circumference of the inner peripheral surface 2c of the bearing hole 2b. The damper portion 126 includes two annular protrusions 121e. The two annular protrusions 121e are arranged in the inner peripheral surface 2c of the bearing hole 2b so as to be spaced apart from each other in the axial direction. The two annular protrusions 121e protrude in the radial direction of the shaft 8. Each of the two annular protrusions 121e extends in an annular shape over the entire circumference of the inner peripheral surface 2c of the bearing hole 2b.

The two annular protrusions 120e are spaced apart from the outer peripheral surface of the outer ring 20a. The oil hole 2d is located between the two annular protrusions 120e. The two annular protrusions 121e are spaced apart from the outer peripheral surface of the outer ring 20a. The oil hole 2d is located between the two annular protrusions 121e.

The annular protrusion on the turbine impeller 9 side of the two annular protrusions 120e is referred to as "first protrusion 120ea". The annular protrusion on the compressor impeller 10 side of the two annular protrusions 120e is referred to as "second protrusion 120eb". That is, the second protrusion 120eb is located toward a direction in which the pair of angular contact bearings approach each other with respect to the first protrusion 120ea. A width of the first protrusion 120ea in the axial direction is smaller than a width of the second protrusion 120eb in the axial direction.

The annular protrusion on the compressor impeller 10 side of the two annular protrusions 121e is referred to as "first protrusion 121ea". The annular protrusion on the turbine impeller 9 side of the two annular protrusions 121e is referred to as "second protrusion 121eb". That is, the second protrusion 121eb is located toward a direction in which the pair of angular contact bearings approach each other with respect to the first protrusion 121ea. A width of the first protrusion 121ea in the axial direction is smaller than a width of the second protrusion 121eb in the axial direction.

The width of the first protrusion 121ea in the axial direction may be equal to or larger than the width of the second protrusion 121eb in the axial direction. Moreover, the width of the first protrusion 120ea in the axial direction may be equal to or larger than the width of the second protrusion 120eb in the axial direction.

The first protrusion 120ea is formed on an extension of a center line (namely, a connection line) indicating a contact angle of the angular contact bearing. However, the second protrusion 120eb may be formed on the extension of the connection line. A space between the first protrusion 120ea and the second protrusion 120eb may be formed on the extension of the connection line. In other words, the damper portion 125 may be formed on the extension of the connection line.

The first protrusion 121ea is formed on an extension of a center line (namely, a connection line) indicating a contact angle of the angular contact bearing. However, the second protrusion 121eb may be formed on the extension of the connection line. A space between the first protrusion 121ea and the second protrusion 121eb may be formed on the extension of the connection line. In other words, the damper portion 126 may be formed on the extension of the connection line.

As described above, the damper portions 25 and 26 (125 and 126) may be formed in any one of the outer peripheral surfaces of the outer rings 20a and 21a and the opposed surfaces of the inner peripheral surface 2c of the bearing hole 2b opposed to the outer peripheral surfaces of the outer rings 20a and 21a. The damper portions 25 and 26 (125 and 126) may be formed in both of the outer peripheral surfaces of the outer rings 20a and 21a and the opposed surfaces of the inner peripheral surface 2c of the bearing hole 2b opposed to the outer peripheral surfaces of the outer rings 20a and 21a. That is, the damper portions 25 and 26 (125 and 126) may be formed in at least one of the outer peripheral surfaces of the outer rings 20a and 21a and the opposed surfaces of the inner peripheral surface 2c of the bearing hole 2b opposed to the outer peripheral surfaces of the outer rings 20a and 21a.

Returning to FIG. 2, the shaft 8 includes a small-diameter portion 8a, a large-diameter portion 8b, and a reduced-diameter portion 8c. The small-diameter portion 8a has a constant outer diameter. The inner rings 20b and 21b of the pair of ball bearings 7 are mounted to the small-diameter portion 8a. The large-diameter portion 8b has a diameter larger than that of the small-diameter portion 8a. The large-diameter portion 8b is formed integrally with the small-diameter portion 8a. The reduced-diameter portion 8c has a diameter smaller than that of the small-diameter portion 8a. The reduced-diameter portion 8c is formed integrally with the small-diameter portion 8a. The large-diameter portion 8b is located on the left side of FIG. 2 with respect to the small-diameter portion 8a. That is, the large-diameter portion 8b is arranged on the turbine impeller 9 side with respect to the small-diameter portion 8a. The reduced-diameter portion 8c is located on the right side of FIG. 2 with respect to the small-diameter portion 8a. That is, the reduced-diameter portion 8c is arranged on the compressor impeller 10 side with respect to the small-diameter portion 8a. The large-diameter portion 8b and the reduced-diameter portion 8c may be formed of members different from that of the small-diameter portion 8a. The large-diameter portion 8b and the reduced-diameter portion 8c may be configured so as to be detachable from the small-diameter portion 8a. The outer diameter of the large-diameter portion 8b is equal to or larger than the outer diameter of the end surface 20i in the inner ring 20b. The inner ring 20b is positioned by the large-diameter portion 8b.

The large-diameter portion 8b includes a large-diameter end surface 8ba and an inclined portion 8bb. The large-diameter end surface 8ba is opposed to the end surface 20i of the inner ring 20b in the axial direction. The inclined portion 8bb is arranged on the turbine impeller 9 side with respect to the large-diameter end surface 8ba. An outer diameter of the inclined portion 8bb is equal to or larger than an outer diameter of the large-diameter end surface 8*ba*. The outer diameter of the inclined portion 8*bb* increases as separating away from the large-diameter end surface 8*ba*. The bearing housing 2 includes a wall portion forming the bearing hole 2*b*. The wall portion of the bearing housing 2 includes a side wall portion 2*f* at a position opposed to the outer ring 20*a* in the axial direction. The side wall portion 2*f* includes a groove 2*fa*. The groove 2*fa* is formed at a position in the side wall portion 2*f* opposed to the inclined portion 8*bb* in a direction orthogonal to the axial direction. The groove 2*fa* has a function of guiding the lubricating oil having passed through the grooves 20*j* of the outer ring 20*a* to the inclined portion 8*bb*.

The end surface (inner ring end surface) 20*i* of the inner ring 20*b* is opposed to the large-diameter end surface 8*ba* in the axial direction. The inner ring 20*b* Includes an inclined portion 20*ia*. The inclined portion 20*ia* is arranged on the compressor impeller 10 side with respect to the end surface 20*i*. An outer diameter of the inclined portion 20*ia* is equal to or larger than an outer diameter of the end surface 20*i*. The outer diameter of the inclined portion 20*ia* increases as separating away from the end surface 20*i*. An outer diameter of the end surface 20*i* is equal to the outer diameter of the large-diameter end surface 8*ba*. In this description, the meaning of "equal" includes the case of being completely equal and the case of deviating from the state of being completely equal within the range of the permissible errors (machining precisions, assembly errors, and the like). However, the outer diameter of the end surface 20*i* may be smaller than the outer diameter of the large-diameter end surface 8*ba*. Moreover, the outer diameter of the end surface 20*i* may be larger than the outer diameter of the large-diameter end surface 8*ba*.

An oil thrower member 22 is attached to the reduced-diameter portion 8*c*. The oil thrower member 22 is configured to scatter the lubricating oil having lubricated the compressor-side bearing 21 toward the outer side in the radial direction. The oil thrower member 22 thus suppresses leakage of the lubricating oil to the compressor impeller 10 side.

A seal plate 24 is attached to the bearing housing 2 on a radially outer side of the oil thrower member 22. The seal plate 24 is arranged at a position opposed to the outer ring 21*a* in the axial direction. The seal plate 24 is configured to suppress leakage of the lubricating oil from the bearing hole 2*b* toward the compressor impeller 10 side.

The oil thrower member 22 includes a large-diameter portion 22*a* having a diameter larger than that of the small-diameter portion 8*a*. That is, the large-diameter portion 22*a*, which is formed of the member (oil thrower member 22) independent of the shaft 8 and has the diameter larger than the diameter of the small-diameter portion 8*a*, is attached to the shaft 8. An outer diameter of the large-diameter portion 22*a* is equal to or larger than an outer diameter of the end surface 21*i* in the inner ring 21*b*. The inner ring 21*b* is positioned by the oil thrower member 22. In this state, the maximum outer diameter of the large-diameter portion 22*a* is equal to the maximum outer diameter of the large-diameter portion 8*b*. In this description, the meaning of "equal" includes the case of being completely equal and the case of deviating from the state of being completely equal within the range of the permissible errors (machining precisions, assembly errors, and the like). However, the maximum outer diameter of the large-diameter portion 22*a* may be different from the maximum outer diameter of the large-diameter portion 8*b*.

The large-diameter portion 22*a* includes a large-diameter end surface 22*aa* and an inclined portion 22*ab*. The large-diameter end surface 22*aa* is opposed to the end surface 21*i* of the inner ring 21*b* in the axial direction. The inclined portion 22*ab* is arranged on the compressor impeller 10 side with respect to the large-diameter end surface 22*aa*. An outer diameter of the inclined portion 22*ab* is equal to or larger than an outer diameter of the large-diameter end surface 22*aa*. The outer diameter of the inclined portion 22*ab* increases as separating away from the large-diameter end surface 22*aa*. The seal plate 24 includes a groove 24*a*. The groove 24*a* is formed at a position in the seal plate 24 opposed to the inclined portion 22*ab* in a direction orthogonal to the axial direction. The groove 24*a* has a function of guiding the lubricating oil having passed through the grooves 21*j* of the outer ring 21*a* to the inclined portion 22*ab*.

The end surface (inner ring end surface) 21*i* of the inner ring 21*b* is opposed to the large-diameter end surface 22*aa* in the axial direction. The inner ring 21*b* includes an inclined portion 21*ia*. The inclined portion 21*ia* is arranged on the turbine impeller 9 side with respect to the end surface 21*i*. An outer diameter of the inclined portion 21*ia* is equal to or larger than an outer diameter of the end surface 21*i*. The outer diameter of the inclined portion 21*ia* increases as separating away from the end surface 21*i*. An outer diameter of the end surface 21*i* is equal to the outer diameter of the large-diameter end surface 22*aa*. In this description, the meaning of "equal" includes the case of being completely equal and the case of deviating from the state of being completely equal within the range of the permissible errors (machining precisions, assembly errors, and the like). However, the outer diameter of the end surface 21*i* may be smaller than the outer diameter of the large-diameter end surface 22*aa*. Moreover, the outer diameter of the end surface 21*i* may be larger than the outer diameter of the large-diameter end surface 22*aa*.

A spacer 23 is an annular member. The shaft 8 is inserted through the spacer 23. The spacer 23 is provided between the inner ring 20*b* and the inner ring 21*b*. An outer diameter of the spacer 23 is smaller than an outer diameter of the end surface 20*h* of the inner ring 20*b*. However, the outer diameter of the spacer 23 may be equal to or larger than the outer diameter of the end surface 20*h* of the inner ring 20*b*. The outer diameter of the spacer 23 is smaller than an outer diameter of the end surface 21*h* of the inner ring 21*b*. However, the outer diameter of the spacer 23 may be equal to or larger than the outer diameter of the end surface 21*h* of the inner ring 21*b*.

The inner ring 20*b*, the spacer 23, and the inner ring 21*b* are inserted from an end portion of the shaft 8 on the compressor impeller 10 side in an order of the inner ring 20*b*, the spacer 23, and the inner ring 21*b*. Moreover, the oil thrower member 22 and the compressor impeller 10 are inserted from the end portion of the shaft 8 on the compressor impeller 10 side in an order of the oil thrower member 22 and the compressor impeller 10. A fastening bolt is fastened to the end portion of the shaft 8 on the compressor impeller 10 side. Compression stress (axial force) is applied to the inner ring 20*b*, the spacer 23, and the inner ring 21*b* in the axial direction. The inner ring 20*b*, the spacer 23, and the inner ring 21*b* rotate integrally with the shaft 8 under a state in which the inner ring 20*b*, the spacer 23, and the inner ring 21*b* are sandwiched by the axial force generated between the large-diameter portion 8*b* and the fastening bolt.

An oil drain hole 2*e* is formed in the bearing housing 2. The oil drain hole 2*e* passes through an inner wall of the bearing hole 2b to a bottom side (bottom side of FIG. 2) in the vertical direction. The lubricating oil fed out from the oil pump (not shown) is supplied from the oil hole 2d into the bearing hole 2b. The lubricating oil is supplied to a space (that is, the damper portion 25) between the bearing hole 2b and the outer peripheral surface of the outer ring 20a. The width of the first protrusion 20ea of the damper portion 25 is smaller than the width of the second protrusion 20eb. Therefore, the lubricating oil is less likely to flow through a space between the second protrusion 20eb and the inner peripheral surface 2c of the bearing hole 2b (due to high resistance). Thus, the lubricating oil supplied between the first protrusion 20ea and the second protrusion 20eb is more likely to leak from the first protrusion 20ea side than from the second protrusion 20eb side. The lubricating oil having contributed to the suppression of the vibration of the shaft 8 in the damper portion 25 leaks from the first protrusion 20ea of the outer ring 20a toward the turbine impeller 9 side. The lubricating oil having leaked from the first protrusion 20ea toward the turbine impeller 9 side is supplied to an inside of the turbine-side bearing 20 through the grooves 20j of the outer ring 20a. The lubricating oil having lubricated the inside of the turbine-side bearing 20 is discharged to a space between the pair of ball bearings 7. The lubricating oil having been discharged to the space between the pair of ball bearings 7 is discharged from the bearing hole 2b through the oil drain hole 2e.

Further, the lubricating oil is supplied to a space (that is, the damper portion 26) between the bearing hole 2b and the outer peripheral surface of the outer ring 21a. The width of the first protrusion 21ea of the damper portion 26 is smaller than the width of the second protrusion 21eb. Therefore, the lubricating oil is less likely to flow through a space between the second protrusion 21eb and the inner peripheral surface 2c of the bearing hole 2b (due to high resistance). Thus, the lubricating oil supplied between the first protrusion 21ea and the second protrusion 21eb is more likely to leak from the first protrusion 21ea side than from the second protrusion 21eb side. The lubricating oil having contributed to the suppression of the vibration of the shaft 8 in the damper portion 26 leaks from the first protrusion 21ea of the outer ring 21a toward the compressor impeller 10 side. The lubricating oil having leaked from the first protrusion 21ea toward the compressor impeller 10 side is supplied to an inside of the compressor-side bearing 21 through the grooves 21j of the outer ring 21a. The lubricating oil having lubricated the inside of the compressor-side bearing 21 is discharged to a space between the pair of ball bearings 7. The lubricating oil having been discharged to the space between the pair of ball bearings 7 is discharged from the bearing hole 2b through the oil drain hole 2e.

In this embodiment, the outer ring 20a and the outer ring 21a are arranged so as to be rotatable (rotational) in the circumferential direction of the shaft 8 with respect to the bearing housing 2 (bearing hole 2b). When the shaft 8 rotates, the inner rings 20b and 21b rotate integrally with the shaft 8. The rolling elements 20c and 21c rotate along with the rotation of the inner rings 20b and 21b. Moreover, the rolling elements 20c and 21c rotate in the circumferential directions of the inner rings 20b and 21b. The outer rings 20a and 21a rotate in the circumferential direction of the shaft 8 along with the rotation and the movement of the rolling elements 20c and 21c, or along with the flow of the lubricating oil. At this time, a rotational speed of the outer ring 20a is lower than a rotational speed of the inner ring 20b. The bearing structure S can obtain a squeeze film damper effect (spring effect) and a wedge effect through the arrangement that the outer rings 20a and 21a are relatively rotatable. The squeeze film damper is a phenomenon that when a vibrating object approaches a fixed surface, a resistance force is generated to the object through a flow and compression of viscous fluid. The vibration of the shaft 8 in the radial direction can be absorbed (suppressed) through the squeeze film damper effect and the wedge effect.

As described above, in the bearing structure S, the outer rings 20a and 21a are arranged so as to be relatively rotatable. Therefore, in the bearing structure S, a pin for preventing the rotation provided in related art is not required to be provided in the bearing hole 2b. Thus, the bearing structure S in this embodiment can reduce the number of components. As a result, the bearing structure S can contribute to a cost reduction of the turbocharger C.

In the bearing structure S, the damper portion 25 is formed in the outer peripheral surface of the outer ring 20a. In the bearing structure S, the damper portion 26 is formed in the outer peripheral surface of the outer ring 21a. Therefore, in the bearing structure S, an annular case portion (so-called oil film damper member) provided in related art is not required to be arranged in the bearing hole 2b. Thus, the bearing structure S in this embodiment can reduce a cost required for machining and assembly work for the case portion. The outer rings 20a and 21a respectively include the damper portions 25 and 26, and the size and the weight of the entire device can be reduced. As described above, the damper portions 125 and 126 may be formed in the opposed surfaces of the inner peripheral surface 2c of the bearing hole 2b opposed to the outer peripheral surfaces of the outer rings 20a and 21a. In a case in which the damper portions 125 and 126 are formed in the bearing hole 2b, the same action and effect can also be obtained as those in the case in which the damper portions 25 and 26 are formed in the outer peripheral surfaces of the outer rings 20a and 21a.

As illustrated in FIG. 2, the pair of angular contact bearings are arranged in the face-to-face duplex combination in the bearing hole 2b. In this state, when the pair of angular contact bearings are arranged in a so-called back-to-back duplex combination in the bearing hole 2b, the thrust load acting toward the right side of FIG. 2 is received mainly by the turbine-side bearing 20. Further, the temperature of the bearing housing 2 on the turbine impeller 9 side tends to reach a high temperature compared with the temperature of the bearing housing 2 on the compressor impeller 10 side. Therefore, an expensive material having high heat resistance is required to be used for the turbine-side bearing 20. The use of the expensive material having the high heat resistance for the ball bearing 7 leads to an increase in cost of the bearing structure S.

When the pair of angular contact bearings are arranged in the face-to-face duplex combination in the bearing hole 2b, the thrust load acting toward the right side of FIG. 2 can be received mainly by the compressor-side bearing 21. Therefore, in this embodiment, the expensive material having the high heat resistance is not required to be used for the turbine-side bearing 20. Thus, the bearing structure S can suppress the cost of the ball bearing 7 itself. In addition, the compressor-side bearing 21 receives the thrust load acting toward the right side of FIG. 2. However, the bearing housing 2 on the compressor impeller 10 side has a lower temperature than that of the bearing housing 2 on the turbine impeller 9 side. Therefore, the expensive material having the high heat resistance is not required to be used for the compressor-side bearing 21. Thus, the bearing structure S can suppress the cost of the ball bearing 7 itself.

In the bearing structure S in this embodiment, the thrust load acting toward the right side of FIG. 2 is received by the end surface 21g of the outer ring 21a and the seal plate 24. Moreover, the thrust load acting toward the left side of FIG. 2 is received by the end surface 20g of the outer ring 20a and the side wall portion 2f of the bearing housing 2.

As described above, in the bearing structure S, the thrust load can be received by the bearing housing 2 or the seal plate 24. Thus, in the bearing structure S, the annular case portion provided on the radially outer side of the pair of ball bearings 7 in related art is not required to be provided. Therefore, in the bearing structure S, a backlash due to the number of components can be reduced.

Moreover, in the bearing structure S, a radially outer spacer (outer ring spacer) is not required to be provided between the outer ring 20a and the outer ring 21a. The number of components can be reduced by omitting the radially outer spacer. Thus, the bearing structure S in this embodiment can contribute to the cost reduction of the turbocharger C. When the radially outer spacer is not provided, the outer rings 20a and 21a are not held in position through application of a preload. Therefore, rolling surfaces of the outer rings 20a and 21a are less likely to be restricted.

Thus, when a foreign matter enters a gap between the outer ring 20a (or the inner ring 20b) and the rolling elements 20c, the foreign matter is likely to be removed through the gap between the outer ring 20a (or the inner ring 20b) and the rolling elements 20c. Moreover, when a foreign matter enters a gap between the outer ring 21a (or the inner ring 21b) and the rolling elements 21c, the foreign matter is likely to be removed through the gap between the outer ring 21a (or the inner ring 21b) and the rolling elements 21c. As a result, a foreign matter is less liable to be stuck in the gap between the outer ring 20a (or the inner ring 20b) and the rolling elements 20c and the gap between the outer ring 21a (or the inner ring 21b) and the rolling elements 21c.

The outer ring 20a in this embodiment has the damper portion 25 in the outer peripheral surface. In the damper portion 25, the width of the first protrusion 20ea is smaller than the width of the second protrusion 20eb. Therefore, the lubricating oil supplied between the first protrusion 20ea and the second protrusion 20eb is more likely to leak from the first protrusion 20ea side than from the second protrusion 20eb side. Thus, the damper portion 25 can supply more lubricating oil to the end surface 20g side (that is, the side wall portion 2f side of the bearing housing 2) of the outer ring 20a than to the end surface 20f side. The end surface 20g and the side wall portion 2f are locations for receiving the thrust load. A required oil amount can sufficiently be supplied to the end surface 20g through the configuration that the width of the first protrusion 20ea is smaller than the width of the second protrusion 20eb.

The outer ring 21a in this embodiment has the damper portion 26 in the outer peripheral surface. In the damper portion 26, the width of the first protrusion 21ea is smaller than the width of the second protrusion 21eb. Therefore, the lubricating oil supplied between the first protrusion 21ea and the second protrusion 21eb is more likely to leak from the first protrusion 21ea side than from the second protrusion 21eb side. Thus, the damper portion 26 can supply more lubricating oil to the end surface 21g side (that is, the seal plate 24 side) of the outer ring 21a than to the end surface 21f side. The end surface 21g and the seal plate 24 are locations for receiving the thrust load. A required oil amount can sufficiently be supplied to the end surface 21g through the configuration that the width of the first protrusion 21ea is smaller than the width of the second protrusion 21eb.

The bearing structure S in this embodiment includes the grooves 20j and 21j respectively in the outer rings 20a and 21a. The lubricating oil supplied to the outer peripheral surface of the outer ring 20a is likely to flow toward the inner peripheral surface side of the outer ring 20a through the formation of the grooves 20j. The temperature of the wall surface forming the bearing hole 2b tends to reach a high temperature. Therefore, in the bearing structure S, it is required that a large amount of the lubricating oil be brought into contact with the side wall portion 2f, to thereby suppress a state in which the temperature of the wall surface becomes unnecessarily high. The lubricating oil is likely to flow through insides of the grooves 20j formed in the end surface 20g. Thus, the grooves 20j can bring the large amount of the lubricating oil into contact with the side wall portion 2f. The large amount of the lubricating oil is brought into contact with the side wall portion 2f, and the grooves 20j can thus increase the cooling effect for the wall surface. Moreover, the lubricating oil is likely to flow toward the inner peripheral surface side of the outer ring 20a due to the grooves 20j, to thereby be capable of suppressing an unnecessarily high temperature of the lubricating oil used to lubricate the rolling elements 20e. Further, the grooves 20j scoop the lubricating oil into the inside through the rotation of the outer ring 20a. Therefore, the lubricating oil supplied to the outer peripheral surface of the outer ring 20a is likely to flow toward the inner peripheral surface side of the outer ring 20a.

The lubricating oil supplied to the outer peripheral surface of the outer ring 21a is likely to flow toward the inner peripheral surface side of the outer ring 21a through the formation of the grooves 21j. The temperature of the wall surface forming the bearing hole 2b tends to reach a high temperature. Therefore, in the bearing structure S, it is required that a large amount of the lubricating oil be brought into contact with the seal plate 24, to thereby suppress a state in which the temperature of the wall surface becomes unnecessarily high. The lubricating oil is likely to flow through insides of the grooves 21j formed in the end surface 21g. Thus, the grooves 21j can bring the large amount of the lubricating oil into contact with the seal plate 24. The large amount of the lubricating oil is brought into contact with the seal plate 24, and the grooves 21j can thus increase the cooling effect for the wall surface. Moreover, the lubricating oil is likely to flow toward the inner peripheral surface side of the outer ring 21a due to the grooves 21j, to thereby be capable of suppressing an unnecessarily high temperature of the lubricating oil used to lubricate the rolling elements 21c. Further, the grooves 21j scoop the lubricating oil into the inside through the rotation of the outer ring 21a. Therefore, the lubricating oil supplied to the outer peripheral surface of the outer ring 21a is likely to flow toward the inner peripheral surface side of the outer ring 21a.

Further, the temperature of the lubricating oil is increased by heat transmitted from the bearing housing 2 on the turbine impeller 9 side. Moreover, the temperature of the lubricating oil is increased by heat transmitted from the bearing housing 2 and the seal plate 24 on the compressor impeller 10 side. The lubricating oil increased in temperature is supplied to the rolling elements 20c and 21c.

A friction coefficient of the rolling elements 20c is reduced through the supply of the lubricating oil. The supply of the lubricating oil to the rolling elements 20c suppresses transmission of a rotational force of the inner ring 20b. A friction coefficient of the rolling elements 21c is reduced through the supply of the lubricating oil. The supply of the lubricating oil to the rolling elements 21c suppresses transmission of a rotational force of the inner ring 21b. As a result of the suppression of the rolling resistance of the rolling elements 20c and 21c, a mechanical loss is reduced.

When the lubricating oil appropriately increased in temperature is supplied to the rolling elements 20c and 21c, the mechanical loss is reduced more than when the lubricating oil without an increase in temperature is supplied to the rolling elements 20c and the rolling elements 21c. Moreover, the grooves 20j are formed in the end surface 20g of the outer ring 20a, and an appropriate amount of the lubricating oil can thus be supplied to the end surface 20g on which the thrust load acts. Through the formation of the grooves 21j in the end surface 21g of the outer ring 21a, an appropriate amount of the lubricating oil can be supplied to the end surface 21g on which the thrust load acts.

As illustrated in FIG. 3, the outer ring 20a in this embodiment includes the grooves 20j extending along the radial direction of the outer ring 20a. Each of the grooves 20j connects the outer peripheral surface side and the inner peripheral surface side of the outer ring 20a with each other along the shortest path. Therefore, the lubricating oil can easily be introduced from the outer peripheral surface side of the outer ring 20a toward the inner peripheral surface side. The outer ring 21a has the same shape as that of the outer ring 20a. Therefore, the lubricating oil can easily be introduced from the outer peripheral surface side of the outer ring 21a toward the inner peripheral surface side.

Moreover, as illustrated in FIG. 4, the outer ring 20a in the first modification example includes the grooves 120j each extending in the direction inclined with respect to the radial direction of the outer ring 20a. The groove 120j has a shape of inclining toward the rotation direction (first direction) side of the outer ring 20a from the radially inner side toward the radially outer side with respect to the radial direction of the end surface 20g. Through the inclination of the grooves 120j with respect to the radial direction, the direction of the extension of the groove 120j can be brought closer to the rotation direction of the outer ring 20a. The direction of the extension of the groove 120j can be brought closer to the rotation direction of the outer ring 20a by increasing the inclination angle with respect to the radial direction.

As the direction of the extension of the groove 120j becomes closer to the rotation direction of the outer ring 20a, the lubricating oil on the outer peripheral surface side of the outer ring 20a is more likely to be introduced toward the inner peripheral surface side when the outer ring 20a rotates. Thus, when the outer ring 20a rotates in the first direction, the grooves 120j are inclined toward the first direction side. As a result, the lubricating oil supplied to the outer peripheral surface of the outer ring 20a is more likely to be introduced toward the inner peripheral surface side of the outer ring 20a than in the case in which each of the grooves 120j extends along the radial direction. Further, when the outer ring 21a in the first modification example rotates in the same direction (counterclockwise when the end surface 21g is viewed from the front) as the rotation direction of the outer ring 20a in the first modification example, the outer ring 21a includes grooves each having a shape of inclining in an direction opposite to that of the groove 120j. That is, the outer ring 21a includes grooves each having a shape of inclining toward the rotation direction (counterclockwise) side of the outer ring 21a from the radially inner side toward the radially outer side with respect to the radial direction of the end surface 21g. Further, when the outer ring 21a in the first modification example rotates in the opposite direction (clockwise when the end surface 21g is viewed from the front) as the rotation direction of the outer ring 20a in the first modification example, the outer ring 21a includes grooves each having a same shape with that of the groove 120j. That is, the outer ring 21a includes grooves each having a shape of inclining toward the rotation direction (clockwise) side of the outer ring 21a from the radially inner side toward the radially outer side with respect to the radial direction of the end surface 21g. Therefore, the lubricating oil can easily be introduced from the outer peripheral surface side of the outer ring 21a toward the inner peripheral surface side.

Moreover, as illustrated in FIG. 5, the outer ring 20a in the second modification example includes the grooves 220j each having the approximately semicircular shape. Through the formation of each of the grooves 220j into the approximately semicircular shape, in a case in which the outer ring 20a rotates in the first direction or the second direction, the same component (outer ring 20a) can be used. That is, irrespective of the rotation direction of the outer ring 20a, the same component (outer ring 20a) can be used. Moreover, the same component (outer ring 20a) can be used for both of the outer ring 20a and the outer ring 21a through the formation of the grooves 220j into the semicircular shapes. Further, the semicircular shapes of the grooves 220j can facilitate the formation of the grooves 220j. In this configuration, when the outer ring 20a rotates in the first direction of FIG. 5, the left-side surface 220ja extends in a direction close to the first direction with respect to the radial direction. As the direction of the extension of the left-side surface 220ja becomes closer to the first direction, the lubricating oil is more likely to be introduced from the outer peripheral surface side of the outer ring 20a toward the inner peripheral surface side when the outer ring 20a rotates. Thus, when the outer ring 20a rotates in the first direction, the left-side surface 220ja are inclined toward the first direction side. With this configuration, the lubricating oil supplied to the outer peripheral surface of the outer ring 20a is more likely to be introduced toward the inner peripheral surface side of the outer ring 20a than in the case in which the left-side surfaces 220ja extend along the radial direction.

In this configuration, when the outer ring 20a rotates in the second direction of FIG. 5, the right-side surface 220jb extends in a direction close to the second direction with respect to the radial direction. As the direction of the extension of the right-side surface 220jb becomes closer to the second direction, the lubricating oil is more likely to be introduced from the outer peripheral surface side of the outer ring 20a toward the inner peripheral surface side when the outer ring 20a rotates. Thus, when the outer ring 20a rotates in the second direction, the right-side surface 220jb are inclined toward the second direction side. With this configuration, the lubricating oil supplied to the outer peripheral surface of the outer ring 20a is more likely to be introduced toward the inner peripheral surface side of the outer ring 20a than in the case in which the right-side surfaces 220jb extend along the radial direction.

In FIG. 5, the left-side surface 220ja and the right-side surface 220jb are formed into the curved shapes. As a result, the lubricating oil supplied to the outer peripheral surface of the outer ring 20a is more likely to be introduced toward the inner peripheral surface side of the outer ring 20a than in the case in which the left-side surface 220ja and the right-side surface 220jb have flat shapes. The outer ring 20a in the second modification example can easily introduce the lubricating oil toward the inner peripheral surface side of the outer ring 20a even in a case in which the outer ring 20a rotates in the first direction or the second direction. The outer ring 21a in the second modification example has the same shape as that of the outer ring 20a in the second modification example. Therefore, the outer ring 21a in the second modification example can easily introduce the lubricating oil from the outer peripheral surface side of the outer ring 21a toward the inner peripheral surface side.

Returning to FIG. 2, the bottom surface 20jc of the groove 20j is formed on the turbine impeller 9 side with respect to the end surface 20da of the retainer 20d. As a result, the outer ring 20a can suppress collision with the retainer 20d and consequent scattering of the lubricating oil flowing through the grooves 20j. Further, the bottom surface 21jc of the groove 21j is formed on the compressor impeller 10 side with respect to the end surface 21da of the retainer 21d. As a result, the outer ring 21a can suppress collision with the retainer 21d and consequent scattering of the lubricating oil flowing through the grooves 21j.

Moreover, the large-diameter portion 8b includes the large-diameter end surface 8ba opposed to the inner ring 20b in the axial direction. Further, the large-diameter portion 8b includes the inclined portion 8bb having the outer diameter decreasing toward the large-diameter end surface 8ba. Still further, the side wall portion 2f of the bearing housing 2 includes the groove 2fa at the portion opposed to the inclined portion 8bb in the direction orthogonal to the axial direction. A part of the lubricating oil having passed through the grooves 20j is introduced into the groove 2fa of the side wall portion 2f of the bearing housing 2. The groove 2fa of the side wall portion 2f guides the lubricating oil having passed through the grooves 20j to the inclined portion 8bb.

The side wall portion 2f can easily lead the lubricating oil to the inclined portion 8bb through the formation of the groove 2fa. The lubricating oil having been led to the inclined portion 8bb collides with the inclined portion 8bb, and is thus moved toward the right side of FIG. 2. That is, the inclined portion 8bb has a function of changing the direction of the flow of the lubricating oil. The inclined portion 8bb can easily introduce a part of the lubricating oil having passed through the grooves 20j and the groove 2fa to a space between the outer peripheral surface of the inner ring 20b and the rolling elements 20c.

Moreover, the large-diameter portion 22a includes the large-diameter end surface 22aa opposed to the inner ring 21b in the axial direction. Further, the large-diameter portion 22a includes the inclined portion 22ab having the outer diameter decreasing toward the large-diameter end surface 22aa. Still further, the seal plate 24 includes the groove 24a at the portion opposed to the inclined portion 22ab in the direction orthogonal to the axial direction. A part of the lubricating oil having passed through the grooves 21j is introduced into the groove 24a of the seal plate 24. The groove 24a of the seal plate 24 guides the lubricating oil having passed through the grooves 21j of the outer ring 21a to the inclined portion 22ab.

The seal plate 24 can easily lead the lubricating oil to the inclined portion 22ab through the formation of the groove 24a. The lubricating oil having been led to the inclined portion 22ab collides with the inclined portion 22ab, and is thus moved toward the left side of FIG. 2. That is, the inclined portion 22ab has a function of changing the direction of the flow of the lubricating oil. The inclined portion 22ab can easily introduce a part of the lubricating oil having passed through the grooves 21j and the groove 24a to a space between the outer peripheral surface of the inner ring 21b and the rolling elements 21c.

Moreover, the inner ring 20b includes the end surface (inner ring end surface) 20i opposed to the large-diameter end surface 8ba in the axial direction. The inner ring 20b includes the inclined portion 20ia having the outer diameter decreasing toward the end surface 20i. The outer diameter of the end surface 20i is equal to the outer diameter of the large-diameter end surface 8ba. In this description, the meaning of "equal" includes the case of being completely equal and the case of deviating from the state of being completely equal within the range of the permissible errors (machining precisions, assembly errors, and the like). A part of the lubricating oil having collided with the inclined portion 8bb smoothly moves from the inclined portion 8bb to the inclined portion 20ia formed in the inner ring 20b. As a result, the inclined portion 20ia can easily introduce a part of the lubricating oil having collided with the inclined portion 8bb to a space between the outer peripheral surface of the inner ring 20b and the rolling elements 20c.

Moreover, the inner ring 21b includes the end surface (inner ring end surface) 21i opposed to the large-diameter end surface 22aa in the axial direction. The inner ring 21b includes the inclined portion 21ia having the outer diameter decreasing toward the end surface 21i. The outer diameter of the end surface 21i is equal to the outer diameter of the large-diameter end surface 22aa. In this description, the meaning of "equal" includes the case of being completely equal and the case of deviating from the state of being completely equal within the range of the permissible errors (machining precisions, assembly errors, and the like). A part of the lubricating oil having collided with the inclined portion 22ab smoothly moves from the inclined portion 22ab to the inclined portion 21ia formed in the inner ring 21b. As a result, the inclined portion 21ia can easily introduce a part of the lubricating oil having collided with the inclined portion 22ab to a space between the outer peripheral surface of the inner ring 21b and the rolling elements 21c.

As described above, the damper portion 25 includes the annular protrusion 20e. The effect of suppressing the vibration of the shaft 8 can be changed (adjusted) through a change in the shape of the annular protrusion 20e. Therefore, the effect of suppressing the vibration of the shaft 8 can be changed without changing the shape of the entire outer ring 20a. Thus, design of the outer ring 20a including the damper portion 25 becomes easier. Moreover, when dimensional accuracy of the annular protrusion 20e is increased, the effect of suppressing the vibration of the shaft 8 can be adjusted with high accuracy. When the dimensional accuracy of the annular protrusion 20e is to be increased, it is not required to increase dimensional accuracy of the entire outer peripheral surface of the outer ring 20a, and an increase in the manufacturing cost of the ball bearings 7 can thus be suppressed.

As described above, the damper portion 26 includes the annular protrusion 21e. The effect of suppressing the vibration of the shaft 8 can be changed (adjusted) through a change in the shape of the annular protrusion 21e. Therefore, the effect of suppressing the vibration of the shaft 8 can be changed without changing the shape of the entire outer ring 21a. Thus, design of the outer ring 21a including the damper portion 26 becomes easier. Moreover, when dimensional accuracy of the annular protrusion 21e is increased, the effect of suppressing the vibration of the shaft 8 can be adjusted with high accuracy. When the dimensional accuracy of the annular protrusion 21e is to be increased, it is not required to increase dimensional accuracy of the entire outer peripheral surface of the outer ring 21a, and an increase in the manufacturing cost of the ball bearings 7 can thus be suppressed.

Moreover, the damper portions 25 and 26 are formed on the extensions of the connection lines. Therefore, load capacities for the loads applied to the portions on the extensions of the connection lines can be increased through the formation of the damper portions 25 and 26 on the extensions of the connection lines.

In the embodiment and the modification examples, a description is given of the example in which the shaft 8 is inserted through the inner ring 20b and the inner ring 21b. However, the configuration is not limited to this example, and the shaft 8 may be press-fitted to the inner ring 20b and the inner ring 21b.

Moreover, in the embodiment and the modification examples, a description is given of the example in which the angular contact bearings are used as the ball bearings 7. However, the configuration is not limited to this example, and deep groove ball bearings or self-aligning ball bearings may be used as the ball bearings 7.

Moreover, in the embodiment and the modification examples, a description is given of the example in which the two ball bearings 7 are provided so as to be spaced apart from each other in the axial direction in the bearing hole 2b. However, the configuration is not limited to this example, and one ball bearing 7 or three or more ball bearings 7 may be arranged in the bearing hole 2b. For example, the ball bearings 7 may have a configuration including the pair of angular contact bearings illustrated in FIG. 2 and a single-row angular contact bearing arranged between the pair of angular contact bearings.

Moreover, the above-mentioned embodiment, first modification example, and second modification example may be combined with one another. For example, the lubricating oil having passed through the grooves 120j in the first modification example or the grooves 220j in the second modification example may be introduced into the groove 2fa of the side wall portion 2f of the bearing housing 2. The lubricating oil having passed through the grooves 120j or the grooves 220j may be introduced into the inclined portion 8bb. The lubricating oil having passed through the grooves 120j or the grooves 220j may be introduced from the inclined portion 8bb into the inclined portion 20ia formed in the inner ring 20b. Moreover, the outer ring 20a in the first modification example or the second modification example may include the first protrusion 20ea and the second protrusion 20eb having a larger width than that of the first protrusion 20ea. The first protrusion 20ea of the outer ring 20a in the first modification example or the second modification example may be formed on the extension of the connection line.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

INDUSTRIAL APPLICABILITY

The present disclosure can be applied to the turbocharger.

What is claimed is:

1. A turbocharger, comprising:
a housing having a bearing hole;
a shaft having a turbine impeller provided at a first end and a compressor impeller provided at a second end;
a pair of angular contact ball bearings, each of which has an inner ring mounted to the shaft, and an outer ring provided so as to be rotatable relative to the bearing hole; and
a damper portion, which is formed in at least one of an outer peripheral surface of the outer ring and an opposed surface of an inner peripheral surface of the bearing hole opposed to the outer peripheral surface,
wherein each of the pair of angular contact ball bearings includes a center line connecting a contact point between the outer ring and rolling elements, and a contact point between the inner ring and the rolling elements, and
wherein the pair of angular contact ball bearings is provided in the bearing hole in a face-to-face duplex combination so that the center lines of the pair of angular contact ball bearings are closer to each other toward an axis of the shaft.

2. The turbocharger according to claim 1, wherein a groove passing through the outer ring of one or each of the pair of angular contact ball bearings from the outer peripheral surface to an inner peripheral surface of the outer ring is formed in an outside surface located toward a direction in which the pair of angular contact ball bearings are spaced apart from each other.

3. The turbocharger according to claim 2, wherein the groove is inclined with respect to a radial direction of the outer ring.

4. The turbocharger according to claim 1,
wherein one or each of the pair of angular contact ball bearings comprises a retainer configured to retain rolling elements provided between the outer ring and the inner ring, and
wherein a bottom surface of the groove does not overlap with the retainer when seen from a radial direction of the shaft.

5. The turbocharger according to claim 3,
wherein one or each of the pair of angular contact ball bearings comprises a retainer configured to retain rolling elements provided between the outer ring and the inner ring, and
wherein a bottom surface of the groove does not overlap with the retainer when seen from a radial direction of the shaft.

6. The turbocharger according to claim 1,
wherein the shaft comprises:
a small-diameter portion to which the inner ring is mounted; and
a large-diameter portion, which has a diameter larger than a diameter of the small-diameter portion, and is formed integrally with the shaft, or formed of a separate member attached to the shaft,
wherein the large-diameter portion includes a large-diameter end surface opposed to the inner ring, and
wherein the large-diameter portion includes an inclined portion having an outer diameter decreasing toward the large-diameter end surface.

7. The turbocharger according to claim 2,
wherein the shaft comprises:
a small-diameter portion to which the inner ring is mounted; and
a large-diameter portion, which has a diameter larger than a diameter of the small-diameter portion, and is formed integrally with the shaft, or formed of a separate member attached to the shaft,
wherein the large-diameter portion includes a large-diameter end surface opposed to the inner ring, and wherein the large-diameter portion includes an inclined portion having an outer diameter decreasing toward the large-diameter end surface.

8. The turbocharger according to claim 3,
wherein the shaft comprises:
   a small-diameter portion to which the inner ring is mounted; and
   a large-diameter portion, which has a diameter larger than a diameter of the small-diameter portion, and is formed integrally with the shaft, or formed of a separate member attached to the shaft,
wherein the large-diameter portion includes a large-diameter end surface opposed to the inner ring, and
wherein the large-diameter portion includes an inclined portion having an outer diameter decreasing toward the large-diameter end surface.

9. The turbocharger according to claim 4,
wherein the shaft comprises:
   a small-diameter portion to which the inner ring is mounted; and
   a large-diameter portion, which has a diameter larger than a diameter of the small-diameter portion, and is formed integrally with the shaft, or formed of a separate member attached to the shaft,
wherein the large-diameter portion includes a large-diameter end surface opposed to the inner ring, and
wherein the large-diameter portion includes an inclined portion having an outer diameter decreasing toward the large-diameter end surface.

10. The turbocharger according to claim 5,
wherein the shaft comprises:
   a small-diameter portion to which the inner ring is mounted; and
   a large-diameter portion, which has a diameter larger than a diameter of the small-diameter portion, and is formed integrally with the shaft, or formed of a separate member attached to the shaft,
wherein the large-diameter portion includes a large-diameter end surface opposed to the inner ring, and
wherein the large-diameter portion includes an inclined portion having an outer diameter decreasing toward the large-diameter end surface.

11. The turbocharger according to claim 6,
wherein the inner ring includes an inner ring end surface opposed to the large-diameter end surface,
wherein the inner ring includes an inclined portion having an outer diameter decreasing toward the inner ring end surface, and
wherein an outer diameter of the inner ring end surface is equal to an outer diameter of the large-diameter end surface.

12. The turbocharger according to claim 1,
wherein the damper portion comprises a first protrusion and a second protrusion, and the second protrusion is located toward a direction in which the pair of angular contact bearings approach each other with respect to the first protrusion, and has a width larger than a width of the first protrusion.

13. The turbocharger according to claim 12, wherein the first protrusion or the second protrusion is formed on an extension of the center line indicating a contact angle of the angular contact bearing.

\* \* \* \* \*